(12) United States Patent
Li et al.

(10) Patent No.: US 6,701,291 B2
(45) Date of Patent: Mar. 2, 2004

(54) AUTOMATIC SPEECH RECOGNITION WITH PSYCHOACOUSTICALLY-BASED FEATURE EXTRACTION, USING EASILY-TUNABLE SINGLE-SHAPE FILTERS ALONG LOGARITHMIC-FREQUENCY AXIS

(75) Inventors: Qi P. Li, New Providence, NJ (US); Olivier Siohan, New Providence, NJ (US); Frank Kao-Ping Soong, Warren, NJ (US)

(73) Assignee: Lucent Technologies Inc., Murray Hill, NY (US)

( * ) Notice: Subject to any disclaimer, the term of this patent is extended or adjusted under 35 U.S.C. 154(b) by 363 days.

(21) Appl. No.: 09/824,076

(22) Filed: Apr. 2, 2001

(65) Prior Publication Data

US 2002/0062211 A1 May 23, 2002

Related U.S. Application Data

(60) Provisional application No. 60/240,202, filed on Oct. 13, 2000.

(51) Int. Cl.$^7$ ............................................. G10L 15/02
(52) U.S. Cl. ....................................... 704/236; 704/251
(58) Field of Search ................................. 704/236, 251

(56) References Cited

U.S. PATENT DOCUMENTS

| | | | | |
|---|---|---|---|---|
| 6,012,334 A | * | 1/2000 | Ando et al. | 73/651 |
| 6,076,058 A | * | 6/2000 | Chengalvarayan | 704/256 |
| 6,370,504 B1 | * | 4/2002 | Zick et al. | 704/251 |
| 6,438,243 B1 | * | 8/2002 | Ikeuchi et al. | 381/191 |
| 2003/0018471 A1 | * | 1/2003 | Cheng et al. | 704/233 |

OTHER PUBLICATIONS

Daivs, S. B., et al., "Comparison of Parametric Representations for Monosyllabic Word Recognition in Continuously Spoken Sentences", *IEEE Transactions on Acoustics, Speech, And Signal Processing*, vol. ASSP–28, No. 4, pp. 357–366 (1980).

Makhoul, J., "Linear Prediction: A Tutorial Review", *Proceedings of the IEEE*, vol. 63, No. 4, pp. 561–580, (1975).

Hermansky, H., "Perceptual linear predictive (PLP) analysis of speech", *J. Acoust. Soc. Am.* 87 (4), pp. 1738–1752 (1990).

Patterson, R. D., "Auditory filter shapes derived with noise stimuli" *J. Acoust. Soc. Am.*, vol. 59, No. 3, pp. 640–654, (1976).

Yost, W. A., "Fundamentals of Hearing, An Introduction", $3^{rd}$ Edition, Academic Press, 1994.

Hermansky, H., "RASTA Processing of Speech", *IEEE Transactions On Speech And Audio Processing*, vol. 2, No. 4, pp. 578–589 (1994).

* cited by examiner

*Primary Examiner*—Tālivaldis Ivars Šmits
(74) *Attorney, Agent, or Firm*—Kenneth M. Brown

(57) ABSTRACT

A method and apparatus for extracting speech features from a speech signal in which the linear frequency spectrum data, as generated, for example, by a conventional frequency transform, is first converted to logarithmic frequency spectrum data having frequency data distributed on a substantially logarithmic (rather than linear) frequency scale. Then, a plurality of digital auditory filters is applied to the resultant logarithmic frequency spectrum data, each of these filters having a substantially similar shape, but centered at different points on the logarithmic frequency scale. Because each of the filters have a similar shape, the feature extraction approach of the present invention advantageously can be easily modified or tuned by adjusting each of the filters in a coordinated manner, with the adjustment of only a handful of filter parameters.

60 Claims, 3 Drawing Sheets

AUTOMATIC SPEECH RECOGNITION WITH PSYCHOACOUSTICALLY-BASED FEATURE EXTRACTION, USING EASILY-TUNABLE SINGLE-SHAPE FILTERS ALONG LOGARITHMIC-FREQUENCY AXIS

CROSS-REFERENCE TO RELATED APPLICATION

The present application hereby claims the benefit of previously filed Provisional patent application Ser. No. 60/240,202, "A High-Performance Auditory Feature For Robust Speech Recognition," filed by Q. P. Li, O. Siohan and F. K. -P. Soong on Oct. 13, 2000.

FIELD OF THE INVENTION

The present invention relates generally to the field of automatic speech recognition and more particularly to a speech signal feature extraction method and apparatus for use therein which is easily tunable and thereby provides improved performance, especially in a variety of adverse (i.e., noisy) environments.

BACKGROUND OF THE INVENTION

In Automatic Speech Recognition (ASR) systems, certain characteristics or "features" of the input speech are compared to a corresponding set of features which have been stored in "models" based on an analysis of previously supplied "training" speech. Based on the results of such a comparison, the input speech is identified as being a sequence of a possible set of words—namely, the words of training speech from which the most closely matching model was derived. The process known as "feature extraction" is the first crucial step in the ASR process.

Specifically, feature extraction comprises extracting a predefined set of parameter values—most typically, cepstral (i.e., frequency-related) coefficients—from the input speech to be recognized, and then using these parameter values for matching against corresponding sets of parameter values which have been extracted from a variety of training speech utterances and stored in the set of speech models. Based on the results of such a matching process, the input speech can be "recognized"—that is, identified as being the particular utterance from which one of the speech models was derived.

Currently, there are two common approaches to feature extraction which are used in automatic speech recognition systems—modeling the human voice production mechanism (i.e., the vocal tract) and modeling the human auditory perception system (i.e., the human cochlea and its processing). For the first approach, one of the most commonly employed features comprises a set cepstral coefficients derived from linear predictive coding techniques (LPCC). This approach uses all-pole linear filters which simulate the human vocal tract. A narrow band (e.g., 4 kHz) LPCC feature works fairly well in the recognition of speech produced in a "clean" noise-free environment, but experiments have shown that such an approach results in large distortions in noisy environments, thereby causing a severe degradation of the ASR system performance.

It is generally accepted that improved performance in an ASR system which needs to be robust in noisy environments can be better achieved with use of the second approach, wherein the human auditory perception system is modeled. For this class of techniques, the most common feature comprises the set of cepstral coefficients derived from the outputs of a bank of filters placed in mel frequency scale (MFCC), familiar to those of ordinary skill in the art. The filters are typically in triangular shapes, and are operated in the frequency domain. Note that the mel frequency scale is similar to the frequency response of the human cochlea. Like the LPCC feature, the MFCC feature works very well in "clean" environments, and although its performance in "adverse" (i.e., noisy) environments may be superior to that of LPCC, ASR systems which have been implemented using the MFCC feature have still not provided adequate performance under many adverse conditions.

Perceptual linear predictive (PLP) analysis is another auditory-based approach to feature extraction. It uses several perceptually motivated transforms including Bark frequency, equal-loudness pre-emphasis, masking curves, etc. In addition, the relative spectra processing technique (RASTA) has been further developed to filter the time trajectory in order to suppress constant factors in the spectral component. It has often been used together with the PLP feature, which is then referred to as the RASTA-PLP feature. Like techniques which use the MFCC feature, the use of these techniques in implemented ASR systems have often provided unsatisfactory results when used in many noisy environments.

Each of the above features is typically based on a Fast Fourier Transform (FFT) to convert speech waveforms from a time domain representation to a frequency domain representation. In particular, however, note that the FFT and other, typical, frequency transforms produce their results on a linear frequency scale. Thus, each of the above perception-based approaches necessarily must perform the filtering process essentially as does the human cochlea—with a complex set of filters differentially spaced in frequency, for example, in accordance with a mel or Bark scale. Moreover, the filters must be individually shaped depending on the particular filter's location along the scale.

Because of the high degree of complexity in developing filter sets for each of these approaches, it has proven to be very difficult to implement ASR systems which have performed well in various noisy environments. In particular, such ASR systems cannot be easily modified (i.e., "tuned") to optimize its performance in different acoustic environments. As such, it would be advantageous to derive an auditory-based speech feature which included a filter set of reduced overall complexity, thereby allowing for the design and implementation of a relatively easily tunable ASR system whose operation can be optimized in a variety of (e.g., noisy) acoustic environments.

SUMMARY OF THE INVENTION

In accordance with the principles of the present invention, an auditory-based speech feature is provided which advantageously includes a filtering scheme which can be easily tuned for use in ASR in a variety of acoustic environments. In particular, the present invention provides a method and apparatus for extracting speech features from a speech signal in which the linear frequency spectrum of the speech signal, as generated, for example, by a conventional frequency transform, is first converted to a logarithmic frequency spectrum having frequency data distributed on a substantially logarithmic (rather than linear) frequency scale. Then, a plurality of filters is applied to the resultant logarithmic frequency spectrum, each of these filters having a substantially similar mathematical shape, but centered at different points on the logarithmic frequency scale. Because each of the filters has a similar shape, an ASR system incorporating the feature extraction approach of the present invention advantageously can be modified or tuned easily, by adjusting each of the filters in a coordinated manner and requiring the adjustment of only a handful of filter parameters.

In accordance with one illustrative embodiment of the present invention, the frequency transform is the FFT, the substantially logarithmic frequency scale is a Bark scale, and the plurality of filters are distributed (i.e., centered) at equal distances along the Bark scale. Also in accordance with this illustrative embodiment of the present invention, an outer and middle ear transfer function is applied to the frequency data prior to the conversion of the frequency spectrum from a linear frequency scale to the substantially logarithmic frequency scale, wherein the outer and middle ear transfer function advantageously approximates the signal processing performed by the combination of the human outer ear and the human inner ear. In addition, and also in accordance with this illustrative embodiment of the present invention, a logarithmic nonlinearity is advantageously applied to the outputs of the filters, and is followed by a discrete cosine transform (DCT) which advantageously produces DCT coefficients for use as speech features in an ASR system.

BRIEF DESCRIPTION OF THE DRAWINGS

FIG. 3 shows the shapes of cochlear filters centered at 1 kHz and 2 kHz;

DETAILED DESCRIPTION

The human auditory system consists of the following modules: outer ear, middle ear, cochlea, hair cells, and nerve system. It converts the sound represented by air pressure to nerve firing rates in various frequency bands for auditory cognition in the brain. Each of these modules has been studied both physiologically as well as from a signal processing point of view, and the results of such studies are familiar to those skilled in the art and are partially presented below. Based on such knowledge, a speech signal feature in accordance with an illustrative embodiment of the present invention may be advantageously derived and used in an ASR system, by modeling the signal processing of each of these models in turn.

First, the outer ear consists of pinna, concha, and a canal leading to the eardrum. The changing acoustic pressure that constantly impinges upon us is collected by the outer ear. The canal and the eardrum provide the main elements of a complex acoustic cavity, such a cavity being expected to change the sound pressure at the eardrum at different frequencies. The frequency transfer function from concha to eardrum is illustratively shown as alternatively dashed and dotted curve 11 in FIG. 1. (The frequency transfer function from concha to eardrum has been measured as part of the prior art, and is thus familiar to those skilled in the art.)

Once the acoustic stimulus reaches the eardrum, it is transmitted from the middle ear to the inner ear. The middle ear couples sound energy from the external auditory meatus to the cochlea and helps to match the impedance of the auditory meatus to the much higher impedance of the cochlear fluid. The sound is transmitted from the eardrum to the oval window of cochlea by three small bones—the malleus, incus and stapes. The middle ear transfer function is illustratively shown as dashed curve 12 in FIG. 1. (The middle ear transfer function has been obtained as part of the prior art, and thus is familiar to those skilled in the art, by measuring the pressures at the eardrum and behind the oval window of a cat.)

Figure 1:
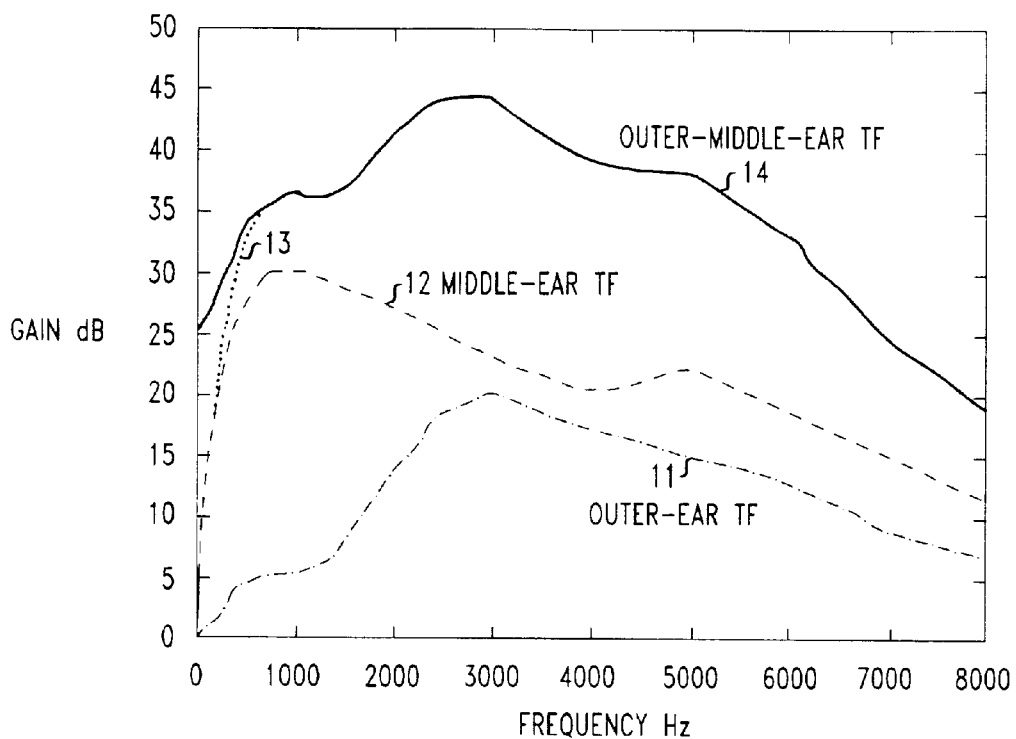
FIG. 1 shows transfer functions for the outer ear and middle ear, for use in accordance with an illustrative embodiment of the present invention.

The overall transfer function from concha to oval window is a cascade response of the outer and middle ear transfer functions, and is shown as dotted curve 13 in FIG. 1. It is also shown as modified on the low frequency bands, as is advantageous for telephone speech input, as solid curve 14 in FIG. 1. (Note that much of dotted curve 13 is not visible as a result of solid curve 14 which overlays most of dotted curve 13.) Note that the entire transfer function as shown from 0 to 8 kHz acts like a bandpass filter, while the portion from 0 to 4 kHz acts like a high-pass filter. The transfer function can be interpreted as a weighting function to different frequency bands. Note that the bands with high-pass are more important than the bands with low-pass in the subsequent signal processing and speech recognition process.

Experiments have shown that the illustrative outer-middle-ear transfer function described herein outperforms the pre-emphasis filter which has been used in the prior art MFCC and LPCC features. (The functionality of the pre-emphasis filter used in these prior art features is fully familiar to those skilled in the art.) Therefore, in accordance with one illustrative embodiment of the present invention, the illustrative outer-middle-ear transfer function described herein is advantageously used in place of the pre-emphasis filter as the "front-end" processing of the illustrative feature. In accordance with this illustrative embodiment of the present invention, for purposes of computational efficiency, the outer-middle-ear transfer function may be advantageously performed after a frequency transform (e.g., an FFT), even though it is the actually the first module found in the human ear.

Next, and located inside the inner ear, is the cochlea, a small snail-shaped organ. When a sound impinges on the eardrum, the vibrations are transmitted to the oval window on the cochlea by the stapes. The vibrations then cause a movement of the cochlear fluids. The cochlear displaces fluid to the round window, at the second window on the cochlea. This initiates a wave of displacement on the basilar membrane which is inside the cochlea. The wave then travels apically.

The cochlea membrane has a high degree of mechanical frequency selectivity. For example, the cochlea membrane gives a sharp peak which is confined to a narrow region to a sine wave of a single frequency. The hair cells connected to the basilar membrane then convert the mechanical movement to a sequence of electrical pulse signals at a corresponding frequency band. Several mathematical models have been developed to simulate the traveling wave from time-domain waveform to frequency transform.

In accordance with an illustrative embodiment of the present invention, a telephone speech input is assumed, and the signal is thus first sampled at a sampling rate of 8 kHz, then blocked into 30 ms, 240 sample blocks. The speech samples are then weighted by a Hamming window:

$$W(n)=0.54+0.46 \cos[2\pi n/(N-1)], \quad (1)$$

where N=240 is the length of the Window. The window is advantageously shifted every 80 samples or, equivalently, every 10 ms. The data at each time frame are then zero-padded to produce a FFT spectrum, $S(\omega)$. Its power spectrum $P(\omega)$ is $$P(\omega)=Re[S(\omega)]^2+Im[S(\omega)]^2, \quad (2)$$

where $\omega$ is the frequency in a linear scale. The signal processing is then advantageously performed in the frequency domain from this point on. The power spectrum with the outer-middle-ear transfer function, $T(\omega)$, is:

$$P_T(\omega)=P(\omega)\cdot T(\omega) \quad (3)$$

Although the frequency of the FFT spectrum is on the linear scale, the frequency along the basilar membrane is on a Bark, ERB-rate, or mel scale, each of which is fully familiar to those of ordinary skill in the art. All of these scales are in fact quite similar and have been determined based on measurements of the human auditory system. Experiments have shown a slightly better performance for the Bark scale than the mel scale. Therefore, in accordance with one illustrative embodiment of the present invention, the Bark scale is used for the illustrative auditory feature described herein. Specifically, the relationship between the Bark scale z and the linear frequency scale f is $$z=13 \text{ arc } \tan(0.76f/1000)+3.5 \text{ arc } \tan(f/7500)^2, \quad (4)$$

where $f$ is in kHz and z is in Bark (critical band rate). This relationship can be advantageously approximated as $$Z = \begin{cases} 13 \arctan(0.76f/1000) & \text{if } f \leq 2 \text{ kHz,} \\ 8.7 + 14.2 \log_{10}(f/1000) & \text{if } 2 \text{ kHz} \leq f < 8 \text{ kHz.} \end{cases} \quad (5)$$

In accordance with the illustrative embodiment of the present invention, for telephone speech the bands between 0 to 17.25 Barks are advantageously selected in order to generate the illustrative feature. These bands correspond to a linear frequency range from 0 to 4 kHz.

To convert the frequency from linear to Bark, we first have the same number of points as in the linear frequency spectrum equally spaced in the Bark scale, and then we project the points onto the corresponding points in the linear scale by:

$$f = \begin{cases} \dfrac{1000}{0.76}\tan(z/13) & \text{if } 0 \text{ Bark} \leq z \leq 10.41 \text{ Bark,} \\ 1000 \cdot 10^{\frac{z-8.7}{14.2}} & \text{if } 10.41 \text{ Bark} \leq z \leq 17.25 \text{ Bark.} \end{cases} \quad (6)$$

Figure 2:
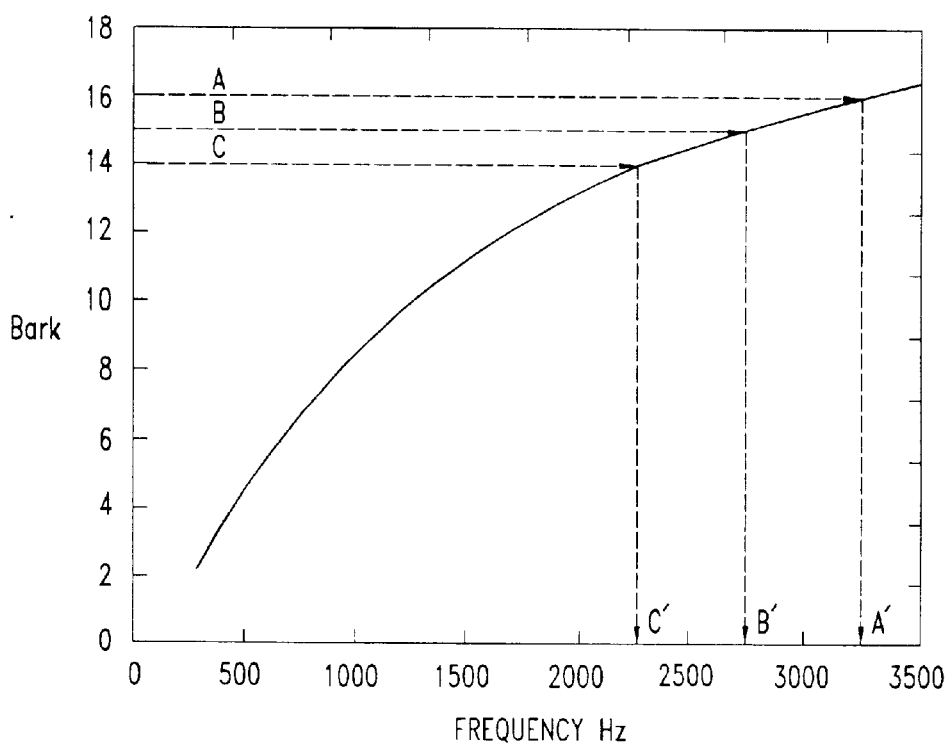
FIG. 2 shows an illustrative frequency conversion graph from a linear frequency scale to the Bark scale.

The projection is illustratively shown in FIG. 2, with three sample projections—A to A', B to B' and C to C'—shown. The converted power spectrum is denoted as $P_B(z)$. Note that the value at each projected point is advantageously obtained by a linear interpolation using the values of the neighboring points in the linear domain.

The selective frequency response of the basilar membrane actually performs as a bank of bandpass filters equally placed in the Bark scale. The shape of the auditory filter has been studied by different methods. One well-accepted result is from the Patterson's method, familiar to those skilled in the art, which assumes that the cochlear filter is reasonably symmetric. (Note that in order to distinguish the "real" human auditory filter from the digital auditory filter which is a "model" thereof, we will herein refer to only the real one as the "cochlear filter.")

Figure 3A:
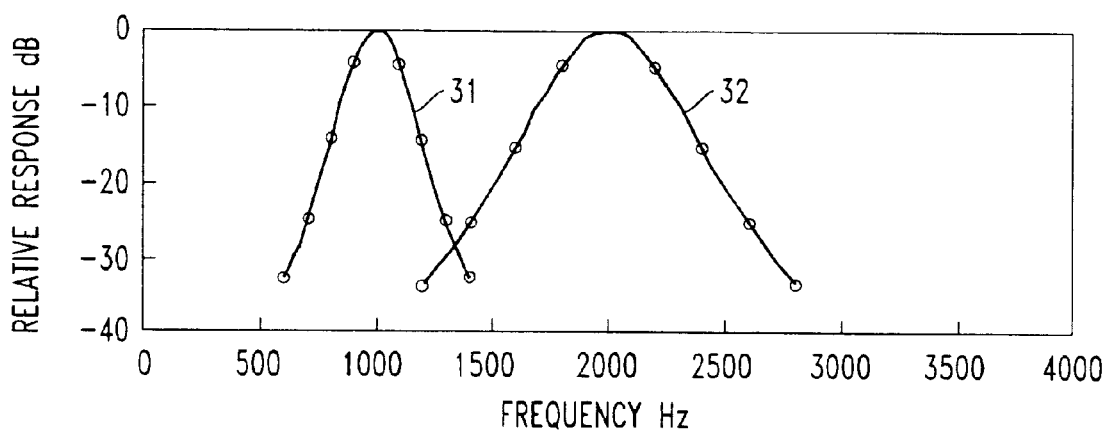
FIG. 3A shows these filters plotted on a linear frequency scale.
Figure 3B:
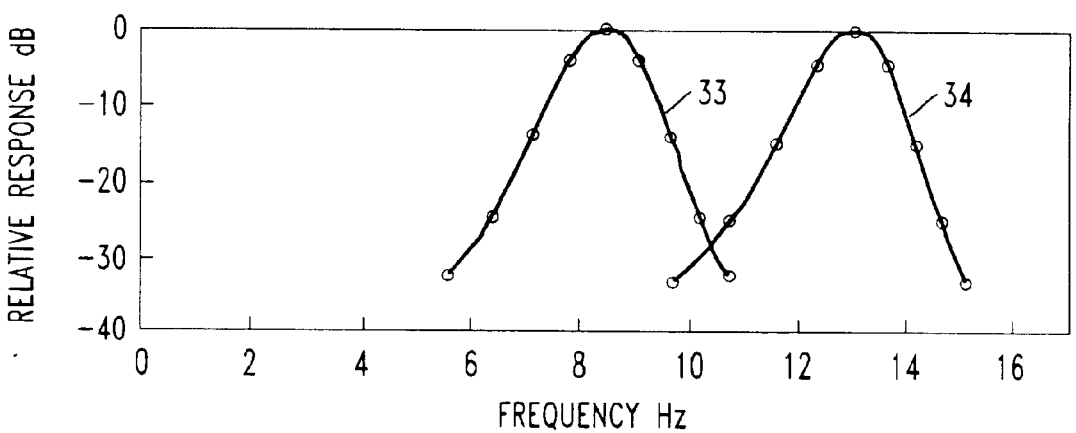
FIG. 3B shows these filters plotted on the Bark scale.

The shapes of two cochlear filters as determined by Patterson's method are illustratively shown in FIG. 3. Specifically, filter response curve 31 and filter response curve 32, as seen in FIG. 3A, are the responses of cochlear filters centered at 1 kHz and 2 kHz, respectively, shown plotted on a linear frequency scale. Similarly, filter response curve 33 and filter response curve 34, as seen in FIG. 3B, are the responses of cochlear filters centered at 1 kHz and 2 kHz, respectively, shown plotted on the Bark scale. From the figure we can observe two facts: first, the shapes of the filters are neither triangular as is assumed in the prior art MFCC feature, nor are they the shape of the weighting function assumed in the prior art PLP feature; and second, the widths of the auditory filters are approximately the same when viewed on the Bark scale, but not when viewed on the linear frequency scale. Thus, it can be seen that the cochlear filter effectively has two characteristics. First, it works as a bandpass filter having a selectively high response to the signal near the central frequency, and second, since the shape of the cochlear filter has a certain width, it can smooth out the noise in the frequency domain.

In accordance with an illustrative embodiment of the present invention, the cochlear filters are advantageously simulated as follows. First, we define a digital auditory filter with a similar shape to Patterson's filter, and we then place a bank of the same filters with centers located at equal distances along the Bark scale. Note that this is equivalent to performing a moving-average operation on the Bark scale. Specifically, for the n'th digital filter located at the z'th point on the Bark spectrum, the filter output is:

$$P_z(n) = \sum_{k=-T}^{T} P_B(z+k)H(k), \quad (7)$$

where the size of the filter is 2T+1, z is the z'th point in the Bark scale, and $H(\cdot)$ is the function of a digital filter.

In accordance with one illustrative embodiment of the present invention which is optimized for telephone speech data with an 8 kHz sampling rate and a 128-point spectrum, the function H(k) may, for example, be defined by the following set of parameters: H(k)={0.0447, 0.1448, 0.3880, 0.6667, 0.94, 1.0000, 0.94, 0.6667, 0.3880, 0.1448, 0.0447}, for $-5 \leq k \leq 5$. This particular filter is illustrative shown in FIG. 4.

Similarly, for speech data with a 16 kHz sampling rate and a 256-point spectrum, the function H(k) may, for example, be defined by the following set of parameters: H(k)= {4.470000e−02, 9.500000e−02, 1.550000e−01, 2.600000e−01, 3.880000e−01, 5.250000e−01, 6.667000e−01, 8.200000e−01, 9.500000e−01, 1.000000e+00, 9.500000e−01, 8.200000e−01, 6.667000e−01, 5.250000e−01, 3.880000e−01, 2.600000e−01, 1.550000e−01, 9.500000e−02, 4.470000e−02}, for $-9 \leq k \leq 9$. Note that in all cases, the filter parameters may be advantageously adjusted for different recognition tasks, as is discussed below.

There are several practical issues in defining an auditory filter in accordance with the present invention. When designing the filter shape, we first advantageously consider the three functions of the auditory filter as described above, and then consider the primary side effect of using the FFT spectrum—pitch harmonics which may not appear in an auditory spectrum generated from digital cochlea models, but that do appear in the FFT spectrum. In practice, and in accordance with the illustrative embodiment of the present invention, we advantageously make the shape of the filter wide enough to smooth out noise and pitch harmonics as much as possible while still providing good frequency resolution. One such filter in accordance with one illustrative embodiment of the present invention and designed for telephone speech at an 8 kHz sampling rate and using a 128-point FFT spectrum is shown in FIG. 4.

Figure 4:
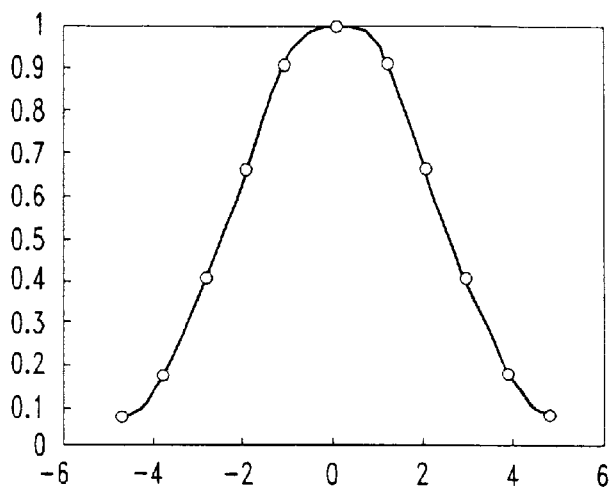
FIG. 4 shows the shape of an illustrative auditory filter for use in accordance with an illustrative embodiment of the present invention.

In accordance with the principles of the present invention, a single filter shape, such as that illustratively shown in FIG. 4, may be advantageously used for the entire spectrum. This makes the implementation much easier and facilitates the adjustment and adaptation of filter parameters when needed. For example, an ASR system designed in accordance with the principles of the present invention may be advantageously modified to be more robust in a given type of (e.g., noisy) environment by modifying only a single set of filter parameters. That is, the easily tunable filter in accordance with the present invention provides for the possibility of significantly improved ASR performance in a variety of possible environments. In addition, to reduce the computational complexity in accordance with one illustrative embodiment of the present invention, we advantageously use 32 filters spaced every 4 points starting from the 4th point of the 128-point FFT spectrum.

Auditory research has shown that the basilar membrane vibration is nonlinear. In other words, the magnitude of the response does not grow directly in proportion with the magnitude of the input. This nonlinearity has heretofore been modeled by taking either a logarithmic function or a cubic-root function of the filter outputs. In accordance with one illustrative embodiment of the present invention, a logarithmic function is advantageously used, since certain experiments have shown that its use results in a better performance that does the use of the cubic-root function.

Then, in accordance with one illustrative embodiment of the present invention, this logarithmic nonlinearity is followed by a discrete cosine transform (DCT), which is fully familiar to those of ordinary skill in the art, to convert the resultant logarithm of the filter outputs to a set of 12 DCT coefficients. The nonlinearity and DCT functions combined are illustratively:

$$C(k) = \sum_{n=1}^{N} w(n) \log(P_z(n)) \cos \frac{\pi(2n-1)(k-1)}{2N}, \quad k = 2, \ldots, 13, \quad (8)$$

where $$w(n) = \begin{cases} \frac{1}{\sqrt{N}}, & n = 1 \\ \sqrt{\frac{2}{\sqrt{N}}}, & 2 \le n \le N \end{cases} \quad (9)$$

and N is the number of auditory filters. Note that the DCT is similar to the cepstral transform. It actually performs a second step to advantageously further smooth out the pitch harmonics in the spectrum. In accordance with one illustrative embodiment of the present invention, short-term energy may be advantageously selected as the energy term in the speech feature, and may be stored in C(1). For example, this short-term energy term may be advantageously computed by accumulating the power of the blocked speech samples before the Hamming window.

Figure 5:
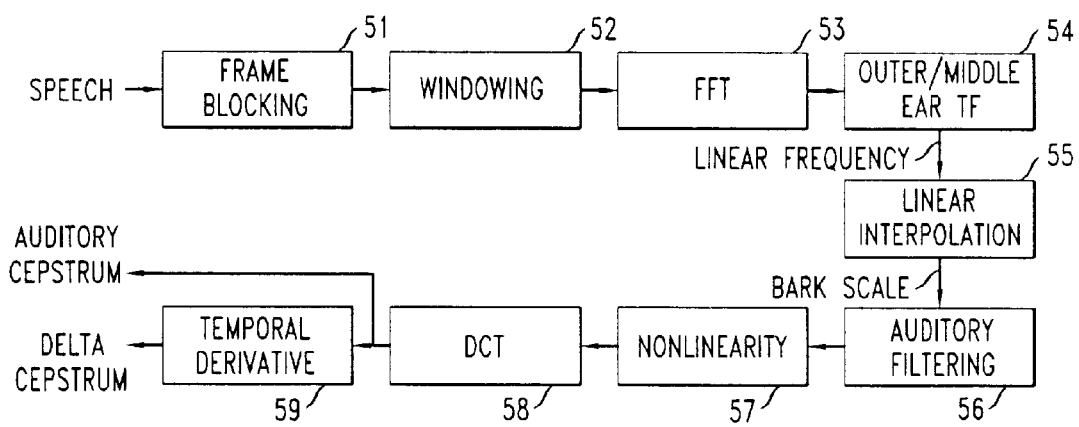
FIG. 5 shows a schematic diagram of an auditory feature extraction system in accordance with an illustrative embodiment of the present invention.

FIG. 5 shows a schematic diagram of an auditory feature extraction system in accordance with an illustrative embodiment of the present invention. The system comprises frame blocking module 51, windowing module 52, FFT module 53, outer and middle ear transfer function 54, linear interpolation module 55, auditory filtering module 56, nonlinearity module 57, DCT module 58, and temporal derivative module 59.

Specifically, frame blocking module 51 and windowing module 52 are fully conventional, generating from the input speech signal individual speech windows for processing. For example, the speech signal may be sampled at a 8 kHz sampling rate and blocked into 240 sample (i.e., 30 ms) blocks by frame blocking module 51. Then windowing module 52 may apply a hamming window, fully familiar to those of ordinary skill in the art, with the window being shifted, for example, every 80 samples (i.e., every 10 ms). Next, FFT module 53, which is also fully conventional, is applied to each time frame—for example, the data at each time frame may be zero-padded to produce a 1024-point FFT, which generates a spectrum of 512 values. All of the subsequent signal processing of the illustrative auditory feature extraction system of FIG. 5 may then be advantageously performed in the frequency domain.

Next, in accordance with an illustrative embodiment of the present invention, outer and middle ear transfer function 54 models the approximate gain in pressure in the human outer and middle ears combined. One illustrative choice of transfer functions for outer and middle ear transfer function 54 is illustratively shown in FIG. 1 and described in detail above. In other embodiments of the present invention, other initial pre-filtering schemes may be used, such as, for example, a pre-emphasis filter similar to that employed in certain prior art features and familiar to those skilled in the art.

Then, in accordance with the principles of the present invention and in particular with one illustrative embodiment thereof, linear interpolation module 55 advantageously converts the (linear) FFT spectrum to the Bark scale spectrum, thereby emulating the frequency scale in the human cochlea. The 512 data points (from the FFT) are advantageously equally spaced in the Bark scale between 0 and 17.25 Barks, which correspond to a linear frequency range from 0 to 4000 Hz. Each Bark point is projected onto a point in Hertz as illustratively shown in FIG. 2 and described above. The value of the projected point may then be advantageously obtained by performing linear interpolation, familiar to those of ordinary skill in the art, using the values of its neighboring points in the linear domain.

Also in accordance with the principles of the present invention and in particular with one illustrative embodiment thereof, auditory filtering module 56 advantageously performs digital auditory filtering with use of a set of identically shaped digital auditory filters, centered at equal distances along the Bark scale, thereby smoothing out the speech spectrum as in the human cochlea. Specifically, these digital auditory filters may, for example, be characterized by the shape as illustratively shown in FIG. 4 and described in detail above. In one illustrative embodiment of the present invention using the 128-point Bark spectrum, 32 digital auditory filters (in the shape as illustratively shown in FIG. 4) are placed every 4 points from the 4th point on the Bark spectrum.

Next, nonlinearity module 57 and DCT module 58, both of which are fully conventional, convert the outputs of the digital auditory filters (after grouping them together into a vector) into a set of 12 cepstral coefficients, such as, for example, is shown in Equations (8) and (9) and described in detail above. In accordance with one illustrative embodiment of the present invention, the linear interpolation and the DCT parameters may be advantageously pre-saved in a table to speedup the computation.

And finally, temporal derivative module 59 produces both first and second order derivatives of the cepstral coefficients, and both the cepstral coefficients plus their first and second order derivatives are advantageously used as the feature set for the "back end" of the ASR system. Temporal derivative module 59 and the use of cepstral coefficients together with their first and second order derivatives are all fully conventional and familiar to those of ordinary skill in the art.

It is been suggested that real cochlear filters are controlled by the human brain in such a manner so as to modify the filter characteristics based on certain acoustic characteristics of the environment. That is, based on the environment (e.g., the presence and type of noise), the cochlear filter characteristics are "adjusted" so as to obtain the best possible performance. Similarly, it is not possible to use one set of fixed feature parameters in a feature extraction method for use in ASR which will necessarily provide the best possible performance at various kinds of recognition tasks performed in various types of acoustic environments.

In accordance with certain illustrative embodiments of the present invention, however, an ASR system may be easily "tuned" for various kinds of recognition tasks and for use in various types of acoustic environments by modifying only a single set of filter parameters. More specifically, while ASR systems which make use of the prior art features described above often would require the modification of hundreds of filter parameters (e.g., 20 to 30 filters with numerous filter parameters for each), an ASR system using an illustrative feature in accordance with the present invention might be "tuned" with the adjustment of only two or three parameters.

Specifically, note that since the illustrative auditory filter, H(x), as illustrative shown in FIG. 4 and described in detail above is symmetric, it can be represented as:

$$H(x)=\{\{F(k)\}_{-W}^{0}, \{F(j)\}_{1}^{W}\}, \quad (10)$$

where the size of the filter is 2W+1 and F(k)=F(−k). Since we keep F(0)=1, only $F(k)_{-W}^{1}$ needs to be adjusted with the following constraint:

$$0<F(k)<F(k+1)<1 , -W \leq k<0. \quad (11)$$

In practice, however, only the points near the top of the filter, such as F(1) and F(2) need to be adjusted for the best performance if it is allowed as part of the training effort in applications.

Addendum to the Detailed Description

It should be noted that all of the preceding discussion merely illustrates the general principles of the invention. It will be appreciated that those skilled in the art will be able to devise various other arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

Software modules, or simply modules which are implied to be software, may be represented herein as any combination of flowchart elements or other elements indicating performance of process steps and/or textual description. Such modules may be executed by hardware which is expressly or implicitly shown.

We claim:

1. A method of extracting speech features from a speech signal for use in performing automatic speech recognition, the method comprising the steps of:

performing a time-to-frequency domain transformation on at least a portion of said speech signal to produce a linear frequency spectrum thereof, wherein said linear frequency spectrum comprises frequency data distributed on a substantially linear frequency scale;

converting said linear frequency spectrum of said speech signal portion to a logarithmic frequency spectrum thereof, wherein said logarithmic frequency spectrum comprises said frequency data distributed on a substantially logarithmic frequency scale;

filtering said logarithmic frequency spectrum of said speech signal portion with a plurality of filters, each of said filters having a substantially similar mathematical shape defined for a plurality of frequencies, and centered at different points on said substantially logarithmic frequency scale; and generating one or more speech features based on one or more outputs of said plurality of filters.

2. The method of claim 1 wherein said time-to-frequency domain transformation comprises a Fast Fourier Transform.

3. The method of claim 1 wherein said substantially logarithmic frequency scale comprises a mel scale.

4. The method of claim 1 wherein said substantially logarithmic frequency scale comprises a Bark scale.

5. The method of claim 4 wherein said plurality of filters are centered at equal distances along the Bark scale.

6. The method of claim 1 further comprising the step of applying to said linear frequency spectrum of said speech signal an outer and middle ear transfer function which approximates a human's outer and middle ear signal processing of an incoming speech signal.

7. The method of claim 1 wherein said step of generating said one or more speech features comprises the steps of performing a discrete cosine transform based on said one or more outputs of said plurality of filters to generate a set of DCT coefficients, and generating said one or more speech features based on said set of DCT coefficients.

8. The method of claim 7 wherein said step of generating said one or more speech features further comprises the step of modifying said one or more outputs of said plurality of filters by applying a nonlinearity to each one of said outputs, and wherein said discrete cosine transform is applied to said modified outputs.

9. The method of claim 7 wherein said one or more speech features comprises each of said DCT coefficients and first and second order derivatives thereof.

10. The method of claim 9 wherein said one or more speech features further comprises a measure of short-term energy of said speech signal.

11. A method of performing automatic speech recognition of a speech signal, the method comprising the steps of:

performing a time-to-frequency domain transformation on at least a portion of said speech signal to produce a linear frequency spectrum thereof, wherein said linear frequency spectrum comprises frequency data distributed on a substantially linear frequency scale;

converting said linear frequency spectrum of said speech signal portion to a logarithmic frequency spectrum thereof, wherein said logarithmic frequency spectrum comprises said frequency data distributed on a substantially logarithmic frequency scale;

filtering said logarithmic frequency spectrum of said speech signal portion with a plurality of filters, each of said filters having a substantially similar mathematical shape defined for a plurality of frequencies, and centered at different points on said substantially logarithmic frequency scale;

generating one or more speech features based on one or more outputs of said plurality of filters; and performing speech recognition of said speech signal based on said one or more speech features.

12. The method of claim 11 wherein said time-to-frequency domain transformation comprises a Fast Fourier Transform.

13. The method of claim 11 wherein said substantially logarithmic frequency scale comprises a mel scale.

14. The method of claim 11 wherein said substantially logarithmic frequency scale comprises a Bark scale.

15. The method of claim 14 wherein said plurality of filters are centered at equal distances along the Bark scale.

16. The method of claim 11 further comprising the step of applying to said linear frequency spectrum of said speech signal an outer and middle ear transfer function which approximates a human's outer and middle ear signal processing of an incoming speech signal.

17. The method of claim 11 wherein said step of generating said one or more speech features comprises the steps of performing a discrete cosine transform based on said one or more outputs of said plurality of filters to generate a set of DCT coefficients, and generating said one or more speech features based on said set of DCT coefficients.

18. The method of claim 17 wherein said step of generating said one or more speech features further comprises the step of modifying said one or more outputs of said plurality of filters by applying a nonlinearity to each one of said outputs, and wherein said discrete cosine transform is applied to said modified outputs.

19. The method of claim 17 wherein said one or more speech features comprises each of said DCT coefficients and first and second order derivatives thereof.

20. The method of claim 19 wherein said one or more speech features further comprises a measure of short-term energy of said speech signal.

21. An apparatus for extracting speech features from a speech signal for use in performing automatic speech recognition, the apparatus comprising:

a time-to-frequency domain transform applied to at least a portion of said speech signal to produce a linear frequency spectrum thereof, wherein said linear frequency spectrum comprises frequency data distributed on a substantially linear frequency scale;

a linear-to-logarithmic frequency spectrum converter applied to said linear frequency spectrum of said speech signal portion to produce a logarithmic frequency spectrum thereof, wherein said logarithmic frequency spectrum comprises said frequency data distributed on a substantially logarithmic frequency scale;

a plurality of filters applied to said logarithmic frequency spectrum of said speech signal portion, each of said filters having a substantially similar mathematical shape defined for a plurality of frequencies, and centered at different points on said substantially logarithmic frequency scale; and a speech feature generator which generates one or more speech features based on one or more outputs of said plurality of filters.

22. The apparatus of claim 21 wherein said time-to-frequency domain transform comprises a Fast Fourier Transform.

23. The apparatus of claim 21 wherein said substantially logarithmic frequency scale comprises a mel scale.

24. The apparatus of claim 21 wherein said substantially logarithmic frequency scale comprises a Bark scale.

25. The apparatus of claim 24 wherein said plurality of filters are centered at equal distances along the Bark scale.

26. The apparatus of claim 21 further comprising an outer and middle ear transfer function applied to said linear frequency spectrum of said speech signal, wherein said outer and middle ear transfer function approximates a human's outer and middle ear signal processing of an incoming speech signal.

27. The apparatus of claim 21 wherein said speech feature generator comprises a discrete cosine transform applied to said one or more outputs of said plurality of filters to generate a set of DCT coefficients, and wherein said one or more speech features are generated based on said set of DCT coefficients.

28. The apparatus of claim 27 wherein said speech feature generator further comprises a nonlinearity module applied to said one or more outputs of said plurality of filters thereby generating one or more modified outputs, and wherein said discrete cosine transform is applied to said modified outputs.

29. The apparatus of claim 27 wherein said one or more speech features comprises each of said DCT coefficients and first and second order derivatives thereof.

30. The apparatus of claim 29 wherein said one or more speech features further comprises a measure of short-term energy of said speech signal.

31. An apparatus for performing automatic speech recognition of a speech signal, the apparatus comprising:
   a time-to-frequency domain transform applied to at least a portion of said speech signal to produce a linear frequency spectrum thereof, wherein said linear frequency spectrum comprises frequency data distributed on a substantially linear frequency scale;
   a linear-to-logarithmic frequency spectrum converted applied to said linear frequency spectrum of said speech signal portion to produce a logarithmic frequency spectrum thereof, wherein said logarithmic frequency spectrum comprises said frequency data distributed on a substantially logarithmic frequency scale;
   a plurality of filters applied to said logarithmic frequency spectrum of said speech signal portion, each of said filters having a substantially similar mathematical shape defined for a plurality of frequencies, and centered at different points on said substantially logarithmic frequency scale;
   a speech feature generator which generates one or more speech features based on one or more outputs of said plurality of filters; and
   a speech recognizer which recognizes said speech signal based on said one or more speech features.

32. The apparatus of claim 31 wherein said time-to-frequency domain transform comprises a Fast Fourier Transform.

33. The apparatus of claim 31 wherein said substantially logarithmic frequency scale comprises a mel scale.

34. The apparatus of claim 31 wherein said substantially logarithmic frequency scale comprises a Bark scale.

35. The apparatus of claim 34 wherein said plurality of filters are centered at equal distances along the Bark scale.

36. The apparatus of claim 31 further comprising an outer and middle inner ear transfer function applied to said linear frequency spectrum of said speech signal, wherein said outer and middle ear transfer function approximates a human's outer and middle ear signal processing of an incoming speech signal.

37. The apparatus of claim 31 wherein said speech feature generator comprises a discrete cosine transform applied to said one or more outputs of said plurality of filters to generate a set of DCT coefficients, and wherein said one or more speech features are generated based on said set of DCT coefficients.

38. The apparatus of claim 37 wherein said speech feature generator further comprises a nonlinearity module applied to said one or more outputs of said plurality of filters thereby generating one or more modified outputs, and wherein said discrete cosine transform is applied to said modified outputs.

39. The apparatus of claim 37 wherein said one or more speech features comprises each of said DCT coefficients and first and second order derivatives thereof.

40. The apparatus of claim 39 wherein said one or more speech features further comprises a measure of short-term energy of said speech signal.

41. An apparatus for extracting speech features from a speech signal for use in performing automatic speech recognition, the apparatus comprising:
   means for performing a time-to-frequency domain transformation on at least a portion of said speech signal to produce a linear frequency spectrum thereof, wherein said linear frequency spectrum comprises frequency data distributed on a substantially linear frequency scale;
   means for converting said linear frequency spectrum of said speech signal portion to a logarithmic frequency spectrum thereof, wherein said logarithmic frequency spectrum comprises said frequency data distributed on a substantially logarithmic frequency scale;
   means for filtering said logarithmic frequency spectrum of said speech signal portion with a plurality of filters, each of said filters having a substantially similar mathematical shape and centered at different points on said substantially logarithmic frequency scale; and
   means for generating one or more speech features based on one or more outputs of said plurality of filters.

42. The apparatus of claim 41 wherein said time-to-frequency domain transformation comprises a Fast Fourier Transform.

43. The apparatus of claim 41 wherein said substantially logarithmic frequency scale comprises a mel scale.

44. The apparatus of claim 41 wherein said substantially logarithmic frequency scale comprises a Bark scale.

45. The apparatus of claim 44 wherein said plurality of filters are centered at equal distances along the Bark scale.

46. The apparatus of claim 41 further comprising means for applying to said linear frequency spectrum of said speech signal an outer and middle ear transfer function which approximates a human's outer and middle ear signal processing of an incoming speech signal.

47. The apparatus of claim 41 wherein said means for generating said one or more speech features comprises
   means for performing a discrete cosine transform based on said one or more outputs of said plurality of filters to generate a set of DCT coefficients, and
   means for generating said one or more speech features based on said set of DCT coefficients.

48. The apparatus of claim 47 wherein said means for generating said one or more speech features further comprises means for modifying said one or more outputs of said plurality of filters by applying a nonlinearity to each one of said outputs, and wherein said discrete cosine transform is applied to said modified outputs.

49. The apparatus of claim 47 wherein said one or more speech features comprises each of said DCT coefficients and first and second order derivatives thereof.

50. The apparatus of claim 49 wherein said one or more speech features further comprises a measure of short-term energy of said speech signal.

51. An apparatus for performing automatic speech recognition of a speech signal, the apparatus comprising:
   means for performing a time-to-frequency domain transformation on at least a portion of said speech signal to produce a linear frequency spectrum thereof, wherein said linear frequency spectrum comprises frequency data distributed on a substantially linear frequency scale;

means for converting said linear frequency spectrum of said speech signal portion to a logarithmic frequency spectrum thereof, wherein said logarithmic frequency spectrum comprises said frequency data distributed on a substantially logarithmic frequency scale;

means for filtering said logarithmic frequency spectrum of said speech signal portion with a plurality of filters, each of said filters having a substantially similar mathematical shape and centered at different points on said substantially logarithmic frequency scale;

means for generating one or more speech features based on one or more outputs of said plurality of filters; and means for performing speech recognition of said speech signal based on said one or more speech features.

52. The apparatus of claim 51 wherein said time-to-frequency domain transformation comprises a Fast Fourier Transform.

53. The apparatus of claim 51 wherein said substantially logarithmic frequency scale comprises a mel scale.

54. The apparatus of claim 51 wherein said substantially logarithmic frequency scale comprises a Bark scale.

55. The apparatus of claim 54 wherein said plurality of filters are centered at equal distances along the Bark scale.

56. The apparatus of claim 51 further comprising means for applying to said linear frequency spectrum of said speech signal an outer and middle ear transfer function which approximates a human's outer and middle ear signal processing of an incoming speech signal.

57. The apparatus of claim 51 wherein said means for generating said one or more speech features comprises means for performing a discrete cosine transform based on said one or more outputs of said plurality of filters to generate a set of DCT coefficients, and means for generating said one or more speech features based on said set of DCT coefficients.

58. The apparatus of claim 57 wherein said step of generating said one or more speech features further comprises means for modifying said one or more outputs of said plurality of filters by applying a nonlinearity to each one of said outputs, and wherein said discrete cosine transform is applied to said modified outputs.

59. The apparatus of claim 57 wherein said one or more speech features comprises each of said DCT coefficients and first and second order derivatives thereof.

60. The apparatus of claim 59 wherein said one or more speech features further comprises a measure of short-term energy of said speech signal.

* * * * *